United States Patent [19]

Dunski

[11] Patent Number: 5,028,486
[45] Date of Patent: Jul. 2, 1991

[54] METALLIC FATTY ACID PELLETS AND METHOD OF MANUFACTURE

[75] Inventor: Neil Dunski, St. Louis, Mo.

[73] Assignee: Mallinckrodt Specialty Chemicals Company, St. Louis, Mo.

[21] Appl. No.: 420,629

[22] Filed: Oct. 10, 1989

Related U.S. Application Data

[63] Continuation of Ser. No. 212,320, Jun. 27, 1988, abandoned.

[51] Int. Cl.⁵ ................................................ B29B 9/06
[52] U.S. Cl. ...................................... 428/402; 260/413; 260/414; 252/384; 252/400.52; 252/400.61; 264/37; 264/118
[58] Field of Search .................. 264/37, 117, 118; 260/413 S, 414; 428/402; 252/35, 36, 39, 384, 400.1, 400.52, 500.51, 400.61

[56] References Cited

U.S. PATENT DOCUMENTS

| | | | |
|---|---|---|---|
| 3,233,022 | 2/1966 | Henry et al. | 264/123 |
| 3,287,480 | 11/1966 | Wechsler et al. | 264/118 |
| 3,406,426 | 10/1968 | Pobst et al. | 264/117 X |
| 4,233,254 | 11/1980 | Sato et al. | 264/37 |
| 4,235,794 | 11/1980 | Rieber et al. | 260/413 S |
| 4,310,483 | 1/1982 | Dorfel et al. | 264/117 |
| 4,368,139 | 1/1983 | Pollock et al. | 252/384 |
| 4,446,086 | 5/1984 | Molenaar et al. | 264/118 |

FOREIGN PATENT DOCUMENTS 893809 11/1982 Belgium .

*Primary Examiner*—Mary Lynn Theisen
*Attorney, Agent, or Firm*—Rothwell, Figg, Ernst & Kurz

[57] ABSTRACT

Metallic salt powder pellets are formed by blending metallic salt powder of aliphatic monocarboxylic acid, with a binder material capable of binding the metallic salt powder under normal bulk handling and transport conditions without altering end use properties of the metallic salt powder, and passing the blended composition through a pellet mill. The metallic salt powder pellets can be handled and transported with greatly reduced risk of generating hazardous dust, and readily disintegrate in conventional blending and mixing apparatus to disperse in a manner similar to unpelletized metallic salt powder.

11 Claims, 1 Drawing Sheet

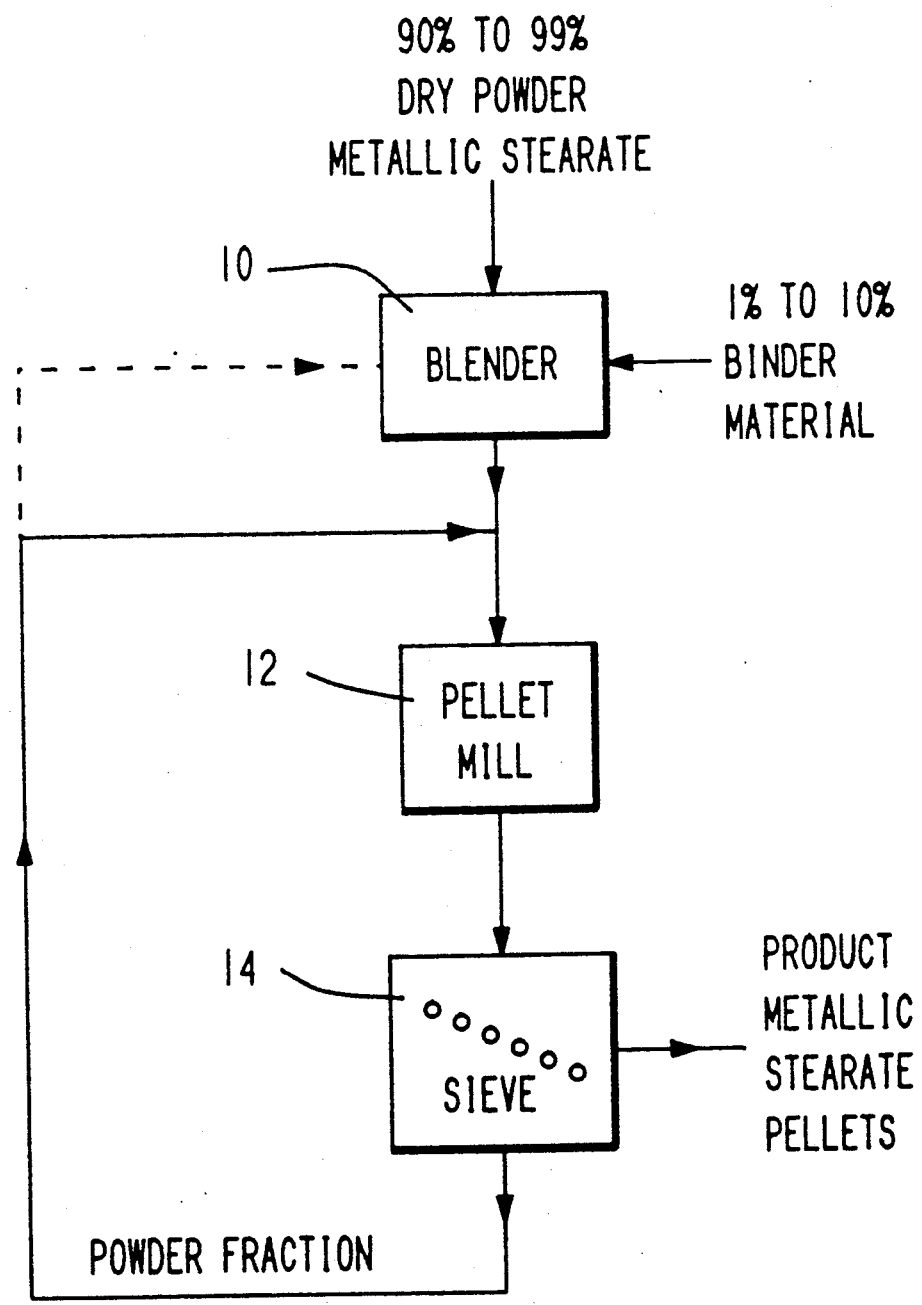

METALLIC FATTY ACID PELLETS AND METHOD OF MANUFACTURE

This is a continuation of application Ser. No. 07,212,320, filed June 27, 1988, now abandoned.

BACKGROUND OF THE INVENTION

1. Field of the Invention

The present invention relates to powder metallic salts of aliphatic monocarboxylic acids, for example, commercial stearic acid, and particularly to a modified powder form and method of manufacture.

2. Description of the Prior Art

Powder metallic salts of commercial stearic acid, commonly known as metallic stearates, which generally consists of 50% to 75% by weight stearic acid (octodecanoic acid), 25% to 50% by weight palmitic acid (hexadecanoic acid), and small amounts, i.e. generally less than 2% by weight, other $C_{12}$–$C_{22}$ aliphatic saturated and unsaturated monocarboxylic acids, are used as additives in a variety of consumer products. For example, aluminum stearate is used as a defoamer for oil well drilling muds, a thickening agent for crayons, a gelling agent for greases and oils, and a suspension agent in paints and inks. Calcium stearate is used as a secondary stabilizer, mold release agent and lubricant in rigid PVC, a neutralizer of residual catalysts in polyethylene and polypropylene, and an anticaking agent in food applications. Magnesium stearate is used as a mold release agent in powders and tablets for cosmetic and pharmaceutical applications, a dispersant and anticaking agent for fire extinguisher powder mixtures, and a lubricant and processing aid in acrylonitrile-butadiene-styrene (ABS) polymers. Zinc stearate is used as a processing and lubricant aid for crystal and impact polystyrene, a dispersing agent in pigment blending, and a lubricant and mold release agent in polyethylene. Lead stearate is used as a stabilizer for PVC.

In many applications, a finely divided or small particle size, such as an average particle size in the range from 2 to 200 microns, is needed for the proper blending and functioning of the metallic stearate. In other applications, an average particle size up to 100 mesh (0.2 mm) can be used. Dry powder metallic stearates, after manufacture, are transported and handled in bulk form, for example, by tank car or truck or may be placed in bags which are then handled and transported to the user. At the user, the bulk metallic stearate, either from storage facilities or bags, is further handled and placed in hoppers to mixers and blenders. During this handling and transport, the fine powdery metallic stearate material is subject to producing dust which is hazardous. For example, metallic stearate dust, if ignited, can result in an explosion causing property damage and serious injury and death to personnel.

The prior art discloses adding 25% by weight mineral oil to the powder to suppress dust formation. However, such quantity of oil dilutes the powder and can often render the powder unsuitable for its intended purpose.

SUMMARY OF THE INVENTION

It has been discovered that powder metallic salts of aliphatic monocarboxylic acids can be pelletized to avoid the formation of dust during transport and handling when from 0.5 to 20% by weight liquid or pliable solid binder material is blended with the powder prior to passing the mixture through a pellet mill. When such powder pellets are used, by blending the metallic stearates in conventional blending and mixing equipment, the pellets readily disintegrate to their powder form, and thus additional grinding equipment is not necessary to return the pellets to a powder form prior to use. Furthermore, careful selection of the particular binding material avoids altering the properties of the end product or the effectiveness of the powder in its intended function.

An object of the invention is to eliminate explosion hazards produced in handling and transport of powder metallic salts of aliphatic monocarboxylic acids.

One advantage of the invention is that expensive dust handling facilities for preventing hazardous dust conditions of powder metallic salts of aliphatic monocarboxylic acids is eliminated.

One feature of the invention is that a variety of materials are suitable for assisting in the binding of the powdery metallic salts of aliphatic monocarboxylic acids so that a particular material may be selected based upon its being relatively inert and non-altering to the end use or consumer product.

Other objects, advantages and features of the invention will be apparent from the following description of the preferred embodiment taken in conjunction with the accompanying drawing wherein:

BRIEF DESCRIPTION OF THE DRAWING

The drawing is a flow diagram illustrating a process for manufacturing powder pellets of metallic salts of aliphatic monocarboxylic acids in accordance with the invention.

DESCRIPTION OF THE PREFERRED EMBODIMENT

As illustrated in the accompanying drawing, powder pellets of metallic salts of aliphatic monocarboxylic acids are produced in accordance with the invention by blending the dry powder and from 0.5 to 20% by weight binder material in a blender 10 and passing the blended material through a pellet mill 12 to form product powder pellets suitable for handling and transport with substantially reduced risk for generating hazardous dust conditions.

The dry powder metallic salt is any powder metallic salt of an aliphatic monocarboxylic acid which is used commercially, is handled and transported in bulk form, and tends to generate hazardous dust conditions during the handling and transport. Generally, calcium, magnesium, aluminum, zinc and lead salts of aliphatic monocarboxylic acids having from 12 to 22 carbon atoms are such powders. Examples are commercial metallic stearates including calcium, magnesium, aluminum, zinc, and lead stearates produced by conventional precipitation and processes from commercial stearic acids which generally consist of 50% to 75% by weight stearic acid (octodecanoic acid), 25% to 50% by weight palmitic acid (hexadecanoic acid), and small amounts, i.e. generally less than 2% by weight, other $C_{12}$–$C_{22}$ aliphatic saturated and unsaturated monocarboxylic acids. The dry powder metallic salt is generally in the range from 80% to 99.5% by weight of the material being added to the blender 10. Preferably, the dry powder metallic salt is in the range from 90% to 99% by weight of the material in the powder pellets, and most preferably, in the range from 96% to 98% by weight of the material in the powder pellets.

Commercial powder metallic stearates generally contain relatively little residual unreacted fatty acid, i.e., less than 1%, so that the powder material cannot be pelletized at ordinary ambient temperatures by mechanical pelletizing equipment. Pellets made from dry powder metallic stearates without the addition of the binder material have little strength and integrity, and will revert back to their dusty, powdery form under normal minimal forces exerted on the pellets during handling and transport.

The binder material is a liquid or pliable solid material which can be readily blended with the metallic stearate without altering the end use properties of the metallic stearate including the dispersal and mixing of the fine powder in a consumer or intermediate product. Generally, suitable binder materials include high boiling materials such as mineral oils, plasticizers, etc. or low melting waxes, fats, fatty acids, silicone oils, etc. Examples of suitable mineral oils include mineral oils having a viscosity in the range from 7 cst to 70 cst at 40° C.; mineral oils with a viscosity in the range from 7 to 30 cst are known as light mineral oils. Examples of suitable plasticizers include bis-(2-ethylhexyl)phthalate, bis-(2-ethylhexyl)adipate, epoxidized soybean oil, epoxidized linseed oil, and diethylene glycol dipelargonate. Examples of suitable waxes include waxes, such as paraffin wax and bayberay wax, having a melting point below 60° C. Examples of suitable fatty acids include stearic acid, palmitic acid, oleic acid, lauric acid, and myristic acid; and suitable fats include those formed from such acids. Examples of suitable silicone fluids include polydimethylsiloxanes having viscosities in the range from 10 to 10,000 cst, copolymers of dimethylsiloxane and diphenylsiloxane, and copolymers of dimethylsiloxane and methylphenylsiloxane. The binder material is generally in the range from 0.5% to 20% by weight of the material being added to the blender 10. Preferably the binder material is in the range from 1% to 10% by weight of the material forming the pellets, and most preferably, in the range from 2% to 4% by weight of the material in the pellets.

The blender 10 is a commercial blender apparatus suitable for blending dry powdery metallic salts of fatty acids with liquid or pliable solid materials in sufficiently large batch or continuous flow techniques suitable to produce the desired quantity of product. The blender is operated in a manner to produce a homogeneous mixture of the binder material and dry powder metallic salt.

The mixed powder and binder material from the blender 10 is then fed to a pellet mill 12 which is also a conventional pellet mill selected for producing throughput at a rate sufficient to handle the desired quantity of product.

The output of the pellet mill is then passed through a sieve 14 where the product metallic powder pellets are separated from a residual powder fraction. Some of the material passing through the pellet mill will not be adequately pelletized or is subject to disintegration upon impinging upon the sieve 14. Such material is then recycled back to the feed hopper or entrance of the pellet mill 12 for further processing. Alternatively, the powder fraction from the sieve 14, or a portion thereof, can be recycled back to the blender 10 as shown in the dashed line.

In accordance with the present invention it is discovered that powder metallic salts of $C_{12}$–$C_{22}$ aliphatic monocarboxylic acids can be formed into pellets when binder materials are blended with the powder and the resulting blended material is passed through a pellet mill. The blending and pelletizing is performed at temperatures well below the melting point of the powder metallic salt to avoid fusion of the powder. Such pellets substantially eliminate the risk of producing hazardous dust conditions during handling and transport of the bulk powder material. When the powder pellets are subsequently passed to commercial blenders or mixing equipment in the formation of consumer products, the powder pellets readily disintegrate, due to the much greater stress applied by such blending and mixing equipment, so that the powder is dispersed and mixed in the same manner as if the powder material had not been formed into pellets.

EXAMPLE 1

Mineral oil, ERVOL light, viscosity 24 to 26 cst at 40° C., white mineral oil, Witco Chemical, 40 g was added gradually to 2000 g Calcium Stearate HP Granular, Mallinckrodt, Inc., being blended in laboratory ribbon mixer model O-A, Paul 0. Abbe, Inc. The mixture was allowed to blend for about 20 minutes. The dry blend thus produced was transferred to the hopper of a laboratory pellet mill model CL-3, California Pellet Mill Company. The pellet mill was equipped with an L89 alloy steel ⅛"×½" die and was operating at about 250 rpm. Dry blended calcium stearate/mineral oil was then fed from the hopper into the die cavity. Product was collected as it emerged out of the die. A product mix containing pellets and powder was collected. It was sieved on a U.S. standard sieve No. 10 separating the pellets from the powder fraction. The fractions were by weight 56% pellets and 46% powder. The powder fraction was passed through the mill for a second time resulting in a total yield by weight of 74% pellets and 26% powder. Pellets made in accordance with Example 1 were substituted for powder calcium stearate in the manufacture of a polyethylene resin. The pellets readily disintegrated in the blending apparatus and formed a homogeneous mixture of linear low density polyethylene which was equal to that normally formed using unpelletized powder calcium stearate.

EXAMPLE 2

In the manner described in Example 1, unmodified Calcium Stearate HP Granular was fed to the pellet mill and the product collected. It consisted of 100% powdery material. Passing the product for a second time and then a third time through the pellet mill did not alter the physical form of the product collected which remained about 100% powder.

EXAMPLE 3

In the manner described in Example 1, 4,000 g Calcium Stearate Standard, Mallinckrodt, Inc. was blended with 80 g 300 Plastics Oil, viscosity 48–60 cst at 40° C., Witco Chemical. After pelletizing the blend and sieving the product, the following fractions by weight were collected: pellets 64%, powder 36%.

EXAMPLE 4

In the manner described in Example 1, 4,000 g Calcium Stearate Standard was blended with 160 g 300 Plastics Oil. After pelletizing the blend and sieving the product, the following fractions by weight were collected: pellets 94.5%, powder 5.5%.

EXAMPLE 5

Aluminum Stearate AX603, Mallinckrodt, Inc. contains about 3.5% of unreacted fatty acid. The material was fed to the pellet mill described in Example 1 and a mixture containing by weight 46% pellets and 54% powder was collected.

EXAMPLE 6

Aluminum Stearate AX603, 550 g, was blended with 11.0 g mineral oil. The blend was then pelletized as described in Example 1. A mixture containing by weight 65% pellets and 35% powder was collected. Improvement in feeding rate, without jamming the mill, as well as in level of pellets produced resulted from the incorporation of mineral oil into the aluminum stearate.

The integrity of the pellets produced in the above Examples 1-6 was ascertained by determining percentage of attrition, i.e. powder produced, in a 50 g sample tumbled at 30 rpm minutes as shown in the following Table I. Tests were run using a PHARMA TEST instrument type PTFR D6452 manufactured in Hainbury, West Germany. Following the 30 minutes test period the sample was transferred to a U.S. standard sieve No. 16. The fraction of sample passing through the screen was determined. The higher that fraction, the weaker the pellets. The following results were obtained:

TABLE I

| Pellets Produced in Example | % Attrition |
|---|---|
| 1 | 10.5 |
| 3 | 19.7 |
| 4 | 4.1 |
| 5 | 3.4 |
| 6 | 2.3 |

Crush strength of aluminum stearate pellets produced in Examples 5 and 6 was determined using a Schieuniger-2E instrument manufactured in Switzerland by Dr. K. Schieuniger & Co. as shown in the following Table II. The results are given in KP units where 1 KP = 2.248 lbs.

TABLE II

| Pellets from Example | Crush Strength, KP |
|---|---|
| 5 | 2.13 |
| 6 | 2.53 |

Since many modifications, variations and changes in detail may be made to the above described embodiment without departing from the scope and spirit of the invention, it is intended that all matter described in the foregoing description and shown in the accompanying drawing be interpreted as only illustrative of the invention.

What is claimed is:

1. Powder pellets comprising pellets formed from a homogenous composition which has been compressed together to form said pellets, said homogenous composition containing from 80% to 99.5% by weight metallic salt powder of aliphatic monomcarboxylic acid, and from 0.5% to 20% by weight liquid or pliable solid binder material capable of binding the metallic salt powder under normal bulk handling and transport conditions without altering end use properties of the metallic salt powder, said metallic salt powder and said binder material being mixed without melting of the metal salt powder and being thereafter compressed into pellets.

2. Powder pellets as claimed in claim 1 wherein the metallic salt powder includes a metallic salt powder selected from the group consisting of calcium stearate, magnesium stearate, aluminum stearate, zinc stearate, and lead stearate.

3. Powder pellets as claimed in claim 1 wherein the binder material is selected from the group consisting of mineral oil, low melting wax, fats, fatty acids, and silicone oil.

4. Powder pellets as claimed in claim 2 wherein the binder material is selected from the group consisting of mineral oil, low melting wax, fats, fatty acids, and silicone oil.

5. Powder pellets as claimed in claim 1 wherein the homogeneous composition contains from 90% to 99% by weight metallic salt powder, and from 1% to 10% by weight binder material.

6. Powder pellets as claimed in claim 5 wherein the homogenous composition consists essentially of from 96% to 98% by weight metallic salt powder of aliphatic monocarboxylic acid, and from 2% to 4% by weight binder material.

7. Powder pellets as claimed in claim 6 wherein the metallic salt powder consists essentially of calcium stearate or aluminum stearate, and the binder material consists essentially of a mineral oil having a viscosity in the range from 7 to 70 cst.

8. A process for manufacture of powder pellets comprising
blending a mixture of from 80% to 99.5% by weight metallic salt powder or aliphatic monocarboxylic acid, and from 0.5% to 20% by weight liquid or pliable solid binder material capable of binding the metallic salt powder under normal bulk handling and transport conditions without altering end use properties of the metallic salt powder, and
passing the blended mixture through a pellet mill so as to compress the blended mixture into metallic salt powder pellets.

9. A process as claimed in claim 8 further comprising sieving the output of the pellet mill to separate the metallic salt pellets from powder residue, and recycling the powder residue through the pellet mill.

10. A process as claimed in claim 8 wherein the blending consists of blending a mixture of from 96% to 98% by weight metallic salt powder of aliphatic monocarboxylic acid, and from 2% to 4% by weight binder material.

11. A process as claimed in claim 10 wherein the metallic salt powder consists essentially of calcium stearate or aluminum stearate, and the binder material consists essentially of a mineral oil having a viscosity in the range from 7 to 70 cst.

* * * * *